United States Patent [19]

Munz

[11] Patent Number: 4,805,078
[45] Date of Patent: Feb. 14, 1989

[54] SWITCHED POWER SUPPLY FOR GENERATING A PLURALITY OF ISOLATED POWER VOLTAGE FOR A PULSE CONVERTER

[75] Inventor: Dieter Munz, Hochstadt, Fed. Rep. of Germany

[73] Assignee: Siemens Aktiengesellschaft, Berlin and Munich, Fed. Rep. of Germany

[21] Appl. No.: 915,084

[22] Filed: Oct. 3, 1986

[30] Foreign Application Priority Data

Jul. 3, 1986 [EP] European Pat. Off. ........ 86109081.9

[51] Int. Cl.$^4$ ............................................ H02M 3/335
[52] U.S. Cl. ........................................ 363/17; 363/56; 363/67; 363/132
[58] Field of Search .................. 363/17, 27, 28, 67, 363/132, 24, 25, 56, 134; 361/100

[56] References Cited

U.S. PATENT DOCUMENTS

| | | | |
|---|---|---|---|
| 4,011,494 | 3/1977 | Saka | 363/17 |
| 4,027,228 | 5/1977 | Collins | 323/289 |
| 4,092,610 | 5/1978 | White et al. | 363/56 |
| 4,199,807 | 4/1980 | Crowe et al. | 363/132 |
| 4,257,089 | 3/1981 | Ravis | 363/25 |
| 4,495,555 | 1/1985 | Eikelboom | 363/28 |
| 4,525,774 | 6/1985 | Kino et al. | 363/17 |
| 4,633,381 | 12/1986 | Upadhyay | 363/98 |

FOREIGN PATENT DOCUMENTS

| | | | |
|---|---|---|---|
| 2924030 | 12/1980 | Fed. Rep. of Germany | 363/17 |
| 3025115 | 1/1982 | Fed. Rep. of Germany | 363/132 |
| 74238 | 7/1978 | Japan | 363/134 |
| 83461 | 6/1980 | Japan | 363/25 |
| 55-49973 | 6/1980 | Japan | . |
| 202888 | 12/1982 | Japan | 363/56 |
| 1001390 | 2/1983 | U.S.S.R. | 363/17 |

OTHER PUBLICATIONS

Siemens-Energietechnik, vol. 6, No. 4, 1984, pp. 182-186.

Valvo Berichte, vol. XVIII (1974), No. 1/2, pp. 143-154.

Primary Examiner—William H. Beha, Jr.
Attorney, Agent, or Firm—Kenyon & Kenyon

[57] ABSTRACT

In a protective power supply, several isolated D.C. voltages are generated by separate inductive transformers, the primary windings of which are arranged in parallel in the diagonal branch of a bridge circuit which has electronic switches controlled in push-pull manner and arranged in two bridge arms. The transformer windings for the protective power supply provided for transistor pulse converters have a low coupling capacity and a small resistance.

3 Claims, 1 Drawing Sheet

SWITCHED POWER SUPPLY FOR GENERATING A PLURALITY OF ISOLATED POWER VOLTAGE FOR A PULSE CONVERTER

BACKGROUND OF INVENTION a. Field of Invention

The present invention relates to a switched power supply for providing several isolated voltages to the control circuits of a transistor pulse converter.

b. Description of the Prior Art

An isolating switched power supply is disclosed in the German journal "Siemens-Energietechnik", Vol. 6, No. 4, 1984, pages 182 to 186. Other switched power supplies are disclosed in "Valvo Berichte", Vol. XVIII (1974), No. 1/2, pages 143 to 154, which provided several isolated voltage sources from a corresponding number of secondary windings. This type of devices, however, necessitates relatively large cores which consequently, have a high ohmic winding resistance, as well as excessively large coupling capacitances between the primary winding and the secondary windings, whereby uncontrollable disturbances can be expected which jeopardizes the proper operation of the electronic driving circuit.

SUMMARY OF THE INVENTION

It is an object of the invention to provide a lowcost device of the type mentioned at the outset, with small coupling capacities between the transformer windings. The power supply comprises individual sections, each having a primary and secondary coil. The primary coils are connected in parallel in the diagonal branch of a main bridge.

BRIEF DESCRIPTION OF THE FIGURES

The invention together with its further embodiments will be explained in the following, referring to the figures wherein.

DETAILED DESCRIPTION OF THE INVENTION

Figure 1:
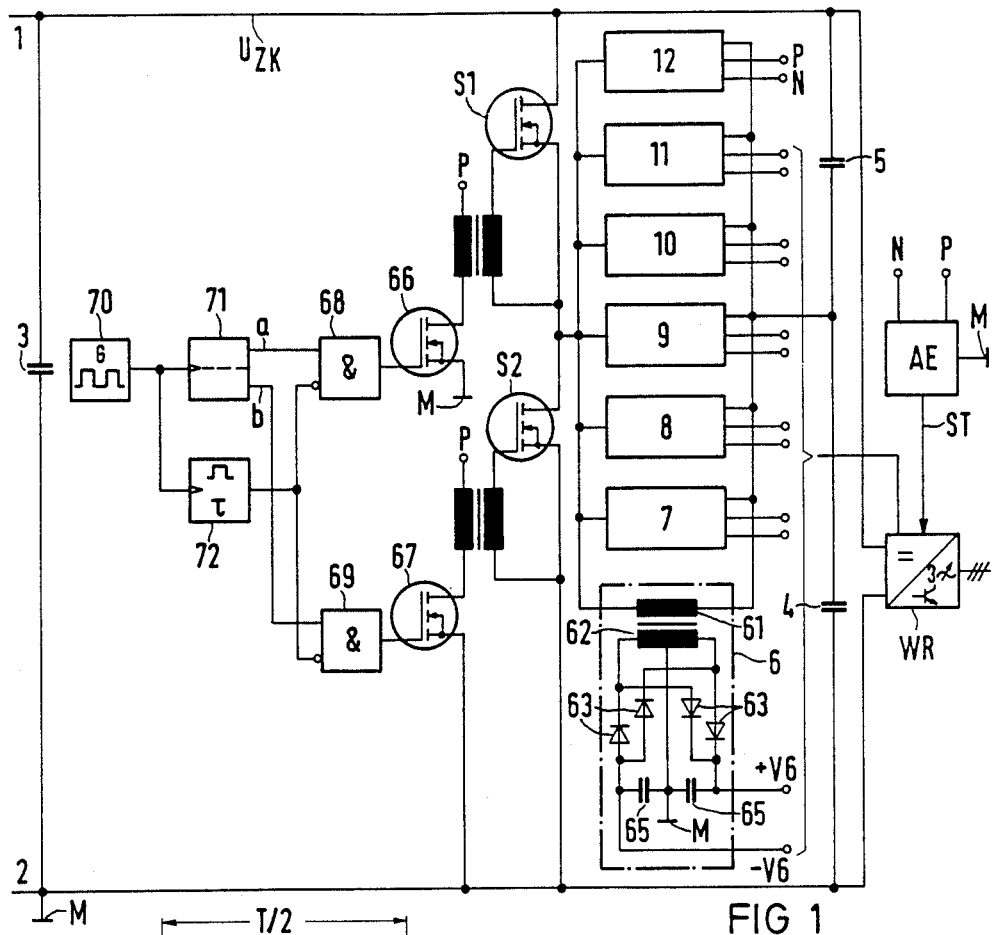
FIG. 1 shows a schematic diagram for a switched power supply constructed according to the invention.

In FIG. 1, a transistor inverter is connected via the lines 1 and 2 of an intermediate d-c link to a smoothing capacitor and a rectifier, not shown. The voltage on line 1 is at a substantially constant d-c level above line 2 which is tied to a reference potential M. The switched power supply according to the invention, receives power on lines 1 and 2 and consists of a bridge circuit with two electronic switches S1 and S2 in one bridge arm as well as two capacitors 4 and 5 in the opposite bridge arm. In the diagonal branch of this bridge circuit there are provided seven converters 6 to 12 of identical design. The output voltage lines P and N of the d-c voltage converter 12 are fed to an electronic driving circuit AE furnishing control signals ST for the inverter WR. The output voltages of the remaining inverters provide other voltages for the control circuits of the power transistors of the inverter WR.

The converter 6, the internal design of which is shown in detail, contains a separate inductive transformer with a primary winding 61 and a single secondary winding 62. The individual primary windings of the converters are connected in parallel. The physical dimensions of the transformers are chosen to satisfy the individual power requirements of each converter whereby, small coupling capacities between the primary and secondary windings are obtained, as well as a correspondingly small ohmic resistance of the windings. The secondary winding of the converter transformer has a center tap which is coupled to a diode bridge circuit 63 having outputs for voltage lines +V6 and −V6 which are symmetrical with respect to the reference potential M, said outputs being smoothed by means of capacitors 65. In the bridge, the rectified current must flow through only a single diode, which further contributes to a small internal resistance of the supply voltage source.

The electronic switches S1 and S2 are operated in push-pull manner, to generate a square-wave current with periodically changing amplitude which is fed to the primary windings of the inductive transformers of the converters 6 to 12. The switches S1 and S2 are preferably power field-effect transistors which are driven by two driver transistors 66 and 67. Transistors 66, 67 are turned on by the output signals of two AND gates 68 and 69 alternatively in accordance with the pulses furnished by a clock generator 70. The output signal of the clock generator 70 is fed to the dynamic input of a bistable multivibrator 71 which changes its state with every leading edge of the output signal from the clock generator 70 and thus enables one of the AND gates 68 and 69 to deliver a signal causing the switch 66 and 67, respectively, to be switched on after a time delay generated by multivibrator 72. The multivibrator 72 is triggered likewise by the leading edge of the pulse from generator 70.

Figure 2:
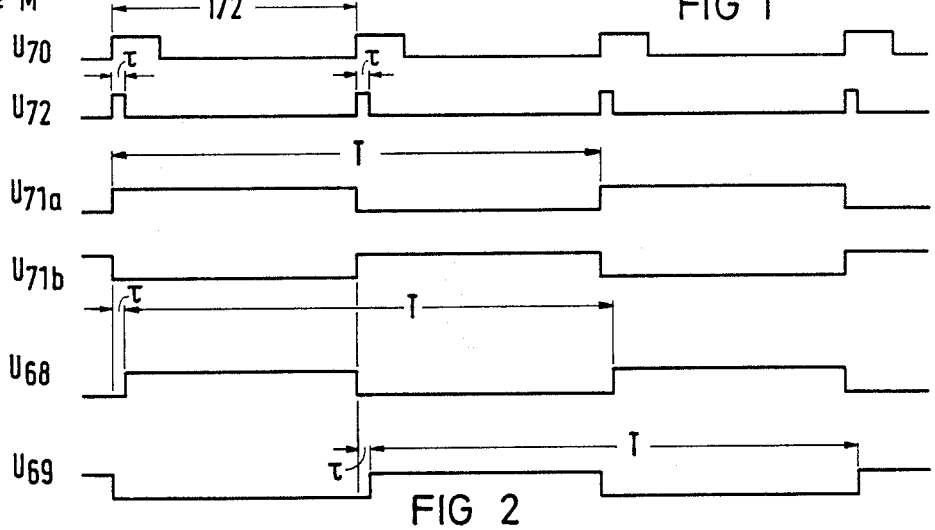
FIG. 2 shows timing diagrams for the operation of the switched power supply of FIG. 1

FIG. 2 shows the pulse timing diagram for the circuit of FIG. 1. The output signals of the switching elements from FIG. 1 are designated with U68 to U72. It is seen that the bistable multivibrator 71 acts as a frequency divider in that it halves the frequency 2/T of the pulses furnished by the clock generator 70 and delives at its outputs (designated by a and b) square wave signals (U71a and U71b) with a duty cycle of 50% and a period T. The operation of the switches 66 and 67 associated with these signals U71a and U71b shown by the output signals U68 and U69, however, is delayed by a delay time t of the monostable multivibrator 72. The delay insures, in view of the response tolerances of the switches 66 and 67, that the switches are never actuated simultaneously and thereby could cause a short circuit between the lines 1 and 2. The delay time t of the monostable multivibrator 72 is advantageously chosen as short as possible, whereby the size of the capacity of the smoothing capacitors 65 can be minimized. A value of t, with which a duty cycle of the pulse voltages U68 and U69 of between 0.49 and 0.47 is obtained for a switching frequency 1/T=50 KHz has been found sufficient.

Overall, an extremely disturbance-proof power supply device is obtained with the invention which, in addition, also has the advantage of an extremely small internal resistance whereby it becomes possible to make available several isolated voltages output which keep a tolerance of less than 10%, without special regulating devices, and independentes of the load.

What is claimed is:

1. A power supply for generating several isolated power voltages for the control circuit of a transistor pulse converter, comprising:

a main bridge coupled to power feed lines, comprising two bridge arms comprising together two series connected electronic field effect transistor switches and two bridge arms comprising together two series connected capacitors, the connection points of said electronic switches and of said capacitors being coupled by a diagonal branch;

a plurality of individual converters, each converter including a converter transformer with a primary coil and a single secondary coil, the primary coils being connected in parallel in said diagonal branch; and control means for alternatively activating said electronic switches, said control means comprising a pulse generator having a clock output, a bistable and a monostable multivibrator, said multivibrators receiving said clock output as input, and having multivibrator outputs; and first and second AND gates for controlling said electronic switches, said AND gates having inputs coupled to said multivibrator outputs.

2. A power supply according to claim 1 wherein each said secondary coil has a center tap and each of said converters includes a circuit connected to said center tap for generating a symmetrical D.C. output with respect to a reference voltage level.

3. A power supply for generating several isolated power voltages for the control circuit of a transistor pulse converter comprising:

a main bridge coupled to power feed lines, comprising two bridge arms comprising together two series connected electronic field effect transistor switches and two bridges arms comprising together two series connected capacitors, the connection points of said electronic switches and of said capacitors being coupled by a diagonal branch;

a plurality of individual converters, each converter including a converter transformer with a primary coil and a single secondary coil, the primary coils being connected in parallel in said diagonal branch; and control means for alternatively activating said electronic switches, said control means comprising a pulse generator with a clock output, a bistable and a monostable multivibrator, said multivibrators receiving said clock output as input, and having multivibrator outputs, and first and second AND gates for controlling said electronic switches, said AND gates having inputs coupled to said multivibrator outputs;

each said secondary coil having a center tap and each of said converters including a circuit connected to said center tap for generating a symmetrical D.C. output with respect to a reference voltage level.

* * * * *